Oct. 8, 1957 H. F. SNOW 2,808,615
METHOD OF WASHING CLAM MEATS
Original Filed Oct. 12, 1953
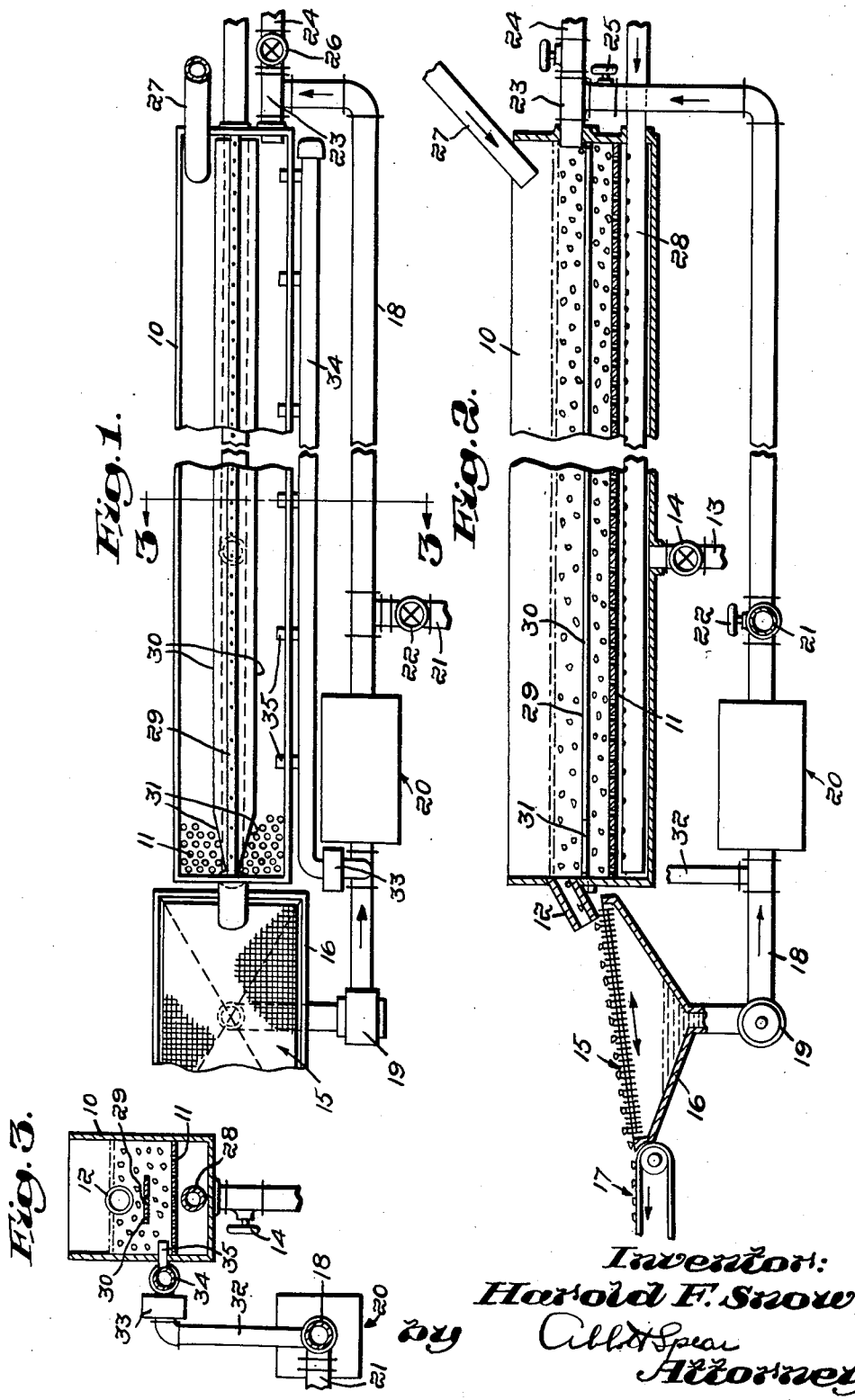
Inventor:
Harold F. Snow,
by Alb H Spear
Attorney

2,808,615

METHOD OF WASHING CLAM MEATS

Harold F. Snow, Pine Point, Maine, assignor to The F. H. Snow Canning Company, Inc., Pine Point, Maine, a corporation of Maine Original application October 12, 1953, Serial No. 385,329. Divided and this application February 28, 1955, Serial No. 492,534

2 Claims. (Cl. 17—45)

This invention relates to methods of ridding the meats of clams and like shellfish of sand.

While the invention may be used to render sand-free such other shellfish as oysters, quahogs, and all other species of clams, it is discussed herein with particular reference to sea clams and to their preparation, under commercial conditions, for canning and freezing. Sea clams are dredged, with specially constructed dredges, from the ocean bottom where they lie about six inches in the sand. After their delivery to the cannery, the clams are manually shucked.

In the dredging operation, some sand is inevitably forced inside the shells, sometimes to such an extent that there will be found to be perhaps one part by weight of sand to five parts by weight of clam meats. As a consequence, the shucked clam meats must be thoroughly washed before they are fit for human consumption and the usual procedure is to subject them to a pre-wash in what is called an "oyster blower" which consists of an open-top tank containing water and having a perforated spreader pipe in its bottom by which air is continuously bubbled through the water thereby constantly agitating it to a considerable extent, thus suspending the clam meats in the water and washing them relatively free of sand. The freed sand settles through a perforated false bottom, located above the spreader pipe, and into the bottom of the tank where the water is relatively quiet.

Usually, the clam meats are held in suspension in the oyster blower, during the pre-wash, for periods ranging from two to five minutes. The clam meats are then removed, by sluicing the water containing them, through a port in the side of the tank just above its false bottom and onto a perforated tray where the wash water is drained away leaving the washed drained clam meats ready to be cleaned.

The cleaning step is a manual operation involving the removal of the contents of the abdominal cavity. Also during cleaning, certain loosely attached skin-like membranes are torn from the clam meats because of their tendency to trap sand particles in their folds.

The cleaned meats are then subjected to a final or finish-washing, using the same equipment employed in the pre-wash and in the same manner except that the time the clam meats are held in suspension is usually increased to periods ranging from seven to thirty minutes. After they are again drained, the clam meats are ground or chopped and then placed into containers for canning or freezing.

The present invention is particularly concerned with the finish-washing step and has for its principal objective the elimination of two major disadvantages inherent in the conventional finish-washing step just described. One of these is that sufficient sand remains in the product after that step to cause a considerable amount of consumer complaints. The other has to do with the loss of flavor through leaching of albuminous matter and solubles from the meats into the water in which they are suspended during washing.

Careful examination of a considerable number of clam meats washed by the conventional finish-wash technique, above described, would reveal the presence of sand particles in several general locations. Clams, like other marine bi-valves, take in and discharge large quantities of water in that part variously known as the head, neck, or siphon, as their means of obtaining food. Sand may thus be usually found in the siphon area when the clam meat is removed from its shell. During dredging, however, much sand is forced into the shell of the clam and ruptures membranes which normally protect the clam meat from sand particles and prevent the body fluids from mixing with sea water. Some of this sand is also often forced into the meat itself. Examination of the muscles, which control the opening and closing of the shells, shows the presence of an occasional sand particle firmly entrenched between sections thereof. Sand is likewise found trapped between a muscle and the tissue which adheres to one of its sides. While some of the loosely held tissue or membranes associated with the clam is removed during the cleaning operation, that which remains often has sand particles entrapped in its folds.

These places are illustrative of those where sand particles may be firmly lodged in clam meats. In addition, there is an occasional clam whose main jacketing membrane traps a large amount of sand, often equal to the weight of the clam itself, and frequently this membrane holds much of the sand during the pre-wash step, and when that clam is cleaned, some of this sand spreads through the mass of meats, sometimes finding its way into cleaned abdominal cavities.

In accordance with the invention, the clam meats may be washed for perhaps a half a minute in the so-called "oyster blower" type of washer for the purpose of washing away small bits of paunch which are inevitably mingled with the clam meats after the cleaning step. This step is optional, being desirable but not altogether necessary. Following this brief wash after the cleaning step, the clam meats are preferably chopped, ground or otherwise cut into pieces, preferably but not necessarily, of the size desired in the processed product. These pieces which will be hereinafter called "ground clam meats" are then subjected to a final wash.

Any of the washes and particularly the final wash, in accordance with the invention, consists of introducing the meats, preferably ground, in the final wash into a liquid body, suspending the meats in the body by agitation to free them of sand and to permit the freed sand to settle from the suspension, and then delivering the meats to a draining station. Best results are obtained, as far as sand removal is concerned, when the meats are ground and are fed continuously through the body to the draining station. Protection against leaching is effected, in any of the washes, by delivery of the drainage from the draining station back to the liquid body.

Apparatus for carrying out the methods, as above broadly summarized, consists of a tank having a screening member dividing it into an upper part for the meats and a lower part to receive sand freed from them. Where leaching is to be avoided, the drainer which receives meats in suspension from the tank is provided with pump controlled means to deliver drainage back to the tank and the delivery line is usually refrigerated.

Where most effective sand removal is required, the tank is relatively long and narrow so that a continuous flow of suspended meats may be delivered to the drainer under circumstances ensuring the freeing therefrom of sand and other unwanted particles. As above indicated, best results are obtained where the meats are ground.

In the accompanying drawings, there is shown an illustrative embodiment of the invention from which these and other of its objectives, novel features, and advantages will be readily apparent.

In the drawings:

Fig. 1 is a somewhat diagrammatic plan view of apparatus for use in continuously washing clam and like meats;

Fig. 2 is a partly sectioned side view of the apparatus shown in Fig. 1; and

Fig. 3 is a section along the indicated lines 3—3 of Fig. 1.

As illustrative of apparatus in accordance with the invention, there is shown an open-top tank 10 which is relatively long, narrow, and shallow and is divided into upper and lower parts by a screening member 11. The upper part is for the clam meats and at one end of the tank 10 and above the member 11, there is an outlet 12 establishing the level of liquid in the tank 10. The apertures of the screening member 11 are dimensioned to prevent the loss of any appreciable amount of the product downwardly therethrough while permitting freed sand particles to settle to the bottom of the lower part of the tank 10 from which they may escape through the drain 13 when the valve 14 is opened.

From the tank 10, the clam meats are delivered to a drainage station shown as consisting of a vibrating screen 15 located above a drain 16 and discharging the drained clam meats onto a tray 17 as indicative of means for conveying them for a subsequent operation. The outlet 12 is shown, for convenience, as discharging directly to the drainage station but, in practice, that station may be located remote from the tank 10 in which case the outlet 12 may be a pump controlled conduit. A conduit 18, provided with a pump 19, effects communication between the drain 16 and the other or infeed end of the tank 10. The conduit 18 passes through a refrigerating unit generally indicated at 20 and is provided with a branch conduit 21 having a valve 22. Adjacent the infeed end of the tank 10 the conduit 18 has a T 23 to which is connected a fresh water supply line 24. Adjacent the T 23 the conduits 18 and 24 are provided with valves 25 and 26 respectively. A supply conduit 27 for the clam meats is shown as entering the tank 10 above the screening member 11.

Liquid and clam meats are thus introduced into the upper part of the tank at one end thereof to establish a stream through it to the draining station. While in the tank 10, the clam meats are so agitated as to effect their suspension in the liquid. As illustrative of agitating means, there is shown a perforated pipe 28 extending substantially from end-to-end of the tank 10 adjacent the bottom of the lower part thereof. The pipe 28 is connected to a suitable source of air under pressure, not shown, and air bubbling up through the liquid is operative to suitably agitate the liquid and, additionally, to keep the apertures of the screening member 11 open.

To further illustrate suitable agitating means, there is shown a shaft 29 extending from end-to-end of the tank 10 above its screening member 11 and supported by the tank end walls for rotation by any suitable means. The shaft 29 carries a pair of oppositely disposed blades 30, each extending approximately the length of the tank 10 but tapering towards each other as at 31 adjacent the outfeed end thereof.

The use of air, for agitating purposes, has the drawback that it is attended by foaming of the liquid, sometimes to an objectionable extent. For that reason, the conduit 18 is provided with a branch conduit 32 in which there is a pump 33 and which is connected to a header 34 extending approximately from end-to-end of the tank 10 at one side thereof. The header 34 has a plurality of branches 35 extending through that side of the tank 10 and terminating as jets to assist in the agitation of the clam meats and to flush away from the upper surface of the screening member 11 any particles that might otherwise clog the apertures in the screening member.

Any one or combinations of these agitating means or the equivalent thereof may be employed to agitate the liquid in the tank 10 to effect the suspension of the clam meats therein. For reasons that will subsequently be apparent, it is preferred that the agitation of the liquid be decreased adjacent the outlet 12. This is accomplished by means of the tapered end portion 31 of the blades 30 and may also be effected as by the spacing of the holes in the spreader pipe 28 and by the spacing of the jets 35 relative to the outlet 12.

In the practice of the invention, the use of the above described apparatus will first be discussed with reference to the finish-washing of ground clams. For example, clams, after being cleaned, may be ground in a grinder having ⅜ to ¾ inch holes and with clam meats so ground, the apertures in the screening member 11 may be in the order of 3/16 of an inch in diameter.

Such ground clam meats and liquid are continuously delivered into the upper part of the tank 10 at the infeed end thereof in desired proportions. For optimum results, the proportion between the clam meats and the liquid is approximately in the range of one part by weight of clam meats to two parts by weight of liquid to one part by weight of clam meats to five parts by weight of liquid. The preferred proportion is approximately one part by weight of clam meats to three parts by weight of liquid. The rate of delivery of clam meats and liquids is dictated by the volume of the tank 10 above the screening member 11 and the length of washing time desired.

While in the tank 10, the clam meats are maintained suspended in the liquid by agitation by any suitable means or combinations thereof and the suspension flows through the outlet 12 to the vibrating screen 15 at a rate equal to the input. Drained meats are thus continuously readied for processing in various conventional manners. The drainage is delivered back to the other end of the tank 10 and from a practical standpoint, it is usually desirable to continuously refrigerate the liquid to prevent souring. The necessity for so doing is dependent on many factors, such as the size of the system, the rate of flow, and the temperature of the meats and liquids. Typically, during operation of the system, the liquid is cooled to approximately 50° F. At the end of a run, the liquid may be chilled to 32° F. or frozen and held for a subsequent run thus to eliminate the need of starting the system with water which would result in the delivery of sub-standard products until equilibrium is established.

As a measure of the effectiveness of the invention in freeing clam meats of sand after they have been ground, much lower sand content results from a two minute finish-wash in accordance with the invention than is obtained in a conventional finish-wash of fifteen minutes, using unground clam meats. This is due, in part, to the fact that the grinding of the clam meats greatly increases the exposure to the liquid of the areas where sand particles lodge.

Another reason for this highly advantageous result is the fact that a lesser degree of turbulence is required to effect the suspension of ground clam meats than is necessary in the case of whole clam meats, thus establishing conditions facilitating the settling of freed sand particles into the bottom of the tank 10 where the liquid is relatively quiet.

In addition to sand, other unwanted particles are often present in clam meats. For example, during the shucking step, pieces of shell from an occasional clam which has been broken during harvesting or in transportation to the cannery, find their way into the meats. Sometimes a sea clam is found with one or more small pebbles lodged in its siphon and while some of these pebbles fall out during the various steps of shucking, often these remain until the clam meats are ground which step, in the usual procedure, takes place after the clam meats are washed. Unfortunately, both the white bits of shell and the pebbles, which are usually light colored, often escape detection, even if they are loose in the clam meat mass, during the various steps partly because they match so closely the coloring of the meats with which they are intermingled. With the degree of turbulence required to maintain whole clam meats in suspension, all the shell pieces and all the pebbles that may have become dislodged, do not settle therefrom. When entire tank contents, as in the case of conventional finish-washing, are discharged onto the draining screen, these unwanted particles often escape detection and are swept along with the product.

In accordance with the invention, pebbles in the siphons are effectively dislodged by grinding the clam meats prior to the finish-wash. Because of the lesser turbulence required in accordance with the invention and because the clam suspension is drawn away continuously from a point near the surface of the liquid and at a rate perhaps only one-tenth that of the conventional procedure, not only do these unwanted particles readily settle from the suspension but also the so-called "hinges," which have a density more nearly that of the meats than the shell, may be settled from or prevented from re-entering the suspension by limiting the agitation adjacent the outlet 12 to the minimum required for the satisfactory suspension of the meats in this zone.

The other major advantages of a finish-wash in accordance with the invention is that it avoids the leaching of desirable albuminous matter and solubles from the meats with their consequent undesirable loss being evidenced most plainly by the loss in flavor of the final product. Leaching, objectionable when washing whole clams, is potentially more serious in the case of ground clam meats but is avoided in accordance with the invention by utilizing, as the washing medium, the liquid which is continuously removed at the draining station from the clam meat suspension.

When the system is first started, it is first filled with water and the proper amount of clam meats. Agitation and circulation are then begun. The liquid portion of the suspension not occluded by the drained, washed clam meats is continuously returned to the intake end of the tank and water is added only to maintain a constant level in the tank 10. Although, at the start, leaching occurs, it rapidly diminishes as the process is continued until a condition of equilibrium results in which that which is leached equals that absorbed. When such equilibrium is realized, the system can be run indefinitely without any change in respect to the concentration of solubles in the washing liquid or in flavor levels of the clam meats. The addition of fresh water is dependent on the amount of draining to which the meats are subjected, for any increase in their water content represents loss of liquid from the system. As has been noted, at the end of a run, the liquid may be drained off through the branch conduit 21 and held for use in filling the tank 10 when another run is to be made.

Alternatively, the washing liquid may be tapped off through the branch conduit 21 at a uniform rate for use in the formulation of such products as clam juice. While the clam meats lose certain amount of the leachable materials originally associated therewith, equilibrium conditions are realized after a short time of operation such that the tapped-off liquid is acceptable for clam juice and the flavor of the clam meat is satisfactory.

In conventional finish-washing, plasmoptysis or swelling of the clam meats occurs concurrently with leaching. In accordance with the invention, this is avoided by the recirculation of the liquid, so that the maintenance of the proper solids content in the drained meats is never a problem.

While the continuous washing of ground clam meats with the liquid being continuously re-cycled, represents preferred treatments, whole clams may be thus processed. In that event, leaching problems are completely avoided but sand removal is not as effective.

It is also possible to wash ground clam meats either in batches or continuously and discard the liquid. Effective sand removal results but the leaching problems remain.

Alternatively, batches of whole or ground clam meats may be washed in liquid drained from prior batches and returned to the tank. While the leaching problem is thus overcome, many advantages of the continuous washing process are not realized.

In the finish-washing of clam meats in accordance with the invention, the two principal shortcomings of the conventional finish-wash are surmounted. In addition to more complete sand removal and protection against loss through leaching, other advantages are realized such as the more effective removal of shell pieces, pebbles and hinges, material labor savings, reduced sewerage disposal problems which are otherwise present because of the high biological oxygen demand of the leachable materials, and markedly reduced water consumption.

What I therefore claim and desire to secure by Letters Patent is:

1. In the treatment of the meats of clams to free them of sand, the steps of continuously introducing ground meats into a liquid body, maintaining said ground meats above the bottom of said body, suspending the ground meats in the body by agitation to free them of sand which settles to the bottom of said body, continuously discharging the ground meats in suspension from said body and draining them, and returning drainage to the liquid body and maintaining the approximate volume thereof by the addition of water thereto without dilution that would result in excessive leaching.

2. In the treatment of the meats of clams to rid them of sand, the steps of continuously introducing the meats into a liquid body of a selected volume, maintaining said meats above the bottom of said body, suspending the meats in the body by agitation to free them of sand which settles to the bottom of said body, continuously discharging the meats in suspension from said body and draining them, maintaining the volume of said body by returning drainage thereto and by adding water thereto, and diverting that part of the drainage for other food uses that enables said volume-maintaining step to be effected without dilution thereof to the extent excessive leaching occurs.

References Cited in the file of this patent

UNITED STATES PATENTS

| 1,011,378 | Shaffer | Dec. 12, 1911 |
| 2,608,716 | Harris | Sept. 2, 1952 |
| 2,640,223 | Secor | June 2, 1953 |

FOREIGN PATENTS

| 267,227 | Great Britain | Mar. 14, 1927 |